H. TUCKER
Door-Knob.
No. 223,259.  Patented Jan. 6, 1880.
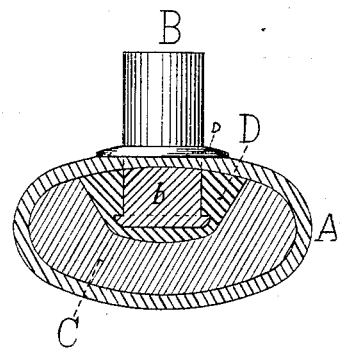
Witnesses:
Theo. S. Ransom
J. A. Sanborn
Inventor.
Hiram Tucker.

UNITED STATES PATENT OFFICE.

HIRAM TUCKER, OF BOSTON, MASSACHUSETTS.

DOOR-KNOB.

SPECIFICATION forming part of Letters Patent No. 223,259, dated January 6, 1880.

Application filed August 6, 1879.

*To all whom it may concern:*

Be it known that I, HIRAM TUCKER, of Boston, in the county of Suffolk and State of Massachusetts, have invented a new and useful Method of Attaching Shanks to Door-Knobs, of which the following is a specification.

My invention relates to an improved method of attaching shanks to hollow glass knobs; and it consists in first placing in the cavity of the knob a quantity of dry calcined plaster-of-paris, to act as a cushion against which the liquid cement, (which is used to hold the metal shank to the bulb,) after hardening, may expand without danger of bursting the knob or destroying the beauty of any ornamentation which may be placed on the inside surface of the glass.

Various kinds of door-knobs made of glass, porcelain, clay, and, perhaps, other materials, have been attached to the metal shanks by which they were connected with the door by means of a cavity in the back of the knob, which was filled with liquid cement or melted metal, into which the end of the shank of the knob was inserted and firmly fixed by the solidifying of the liquid cement or melted metal. The shanks were usually provided with a flange near the end, which was inserted into the knob, the edge of which came down onto the outer surface of the knob, while a space between the shank and the outer edge of the flange received a portion of the cement or melted metal, and assisted in holding the shank in its place.

A certain class of glass knobs have of late years been made with an internal cavity much larger than was necessary to hold the shank to the knob, forming what might properly be termed a hollow knob, the glass forming a comparatively thin shell. Such knobs have been very commonly silvered on the inside, so as to give to the eye somewhat the appearance of a polished silver knob. It is important to preserve this film of silver from injury in order that the knob may present the appearance which the silvering is designed to give it.

Various means have been resorted to for attaching these hollow knobs to the shanks, one of which has been to fill the whole body of the knob with cement and insert the end of the shank in it in the manner above stated. But the size of the cavity and the amount of cement required to fill it was attended with two evils, one of which was, that the expansion of the cement by an increase of temperature was very apt to break the glass and thus destroy the knob. Another was, that changes of temperature not sufficient to burst the knob were still liable to move the cement where it was in contact with the glass shell, and in doing this disturbed the film of silver on the internal surface of the glass. This latter evil was especially likely to occur when the temperature of one part of the cement was raised above that of the other parts, though not sufficient to break the glass. Any change in the temperature of the knob was likely to be attended by an unequal expansion of the glass and of the cement in contact with it, so that the surface of one would move without reference to the surface of the other, such movement necessarily destroying or disturbing the continuity of the film of silver between the two.

A modification of this method of attaching the shank to the knob was to fill partially the knob with cement, place the shank in position, and reverse the position of the parts, so that the knob should be up and should stand vertically with the shank below it, so that a portion of the liquid cement would run down into the space around the shank, and, in hardening, fix it in place, leaving a cavity within the knob. By this method the danger of the bursting of the knob by the expansion of the cement was greatly diminished, the internal cavity allowing the cement to expand without exerting any considerable pressure upon the glass itself; but inasmuch as a portion of the cement would adhere to the silvered surface of the glass, and was likely, when the temperature of the knob, or any portion of it, was raised, to expand in a different manner from the glass itself, the liability to disturb or destroy the silvering still remained.

I have devised a method of obviating these difficulties, which consists in placing within the knob, before the shank is attached to it, a mass of finely-powdered material which nearly fills the knob. In this powdered material I form a chamber similar to that which was formerly within the knobs first referred to, and into which a quantity of cement or melted metal can be poured, so as not to come in contact with the glass, except in the vicinity of the orifice through which the shank was inserted, as in the old method of attaching shanks.

The powdered material which I prefer to use for filling the knob is finely-pulverized plaster-of-paris. Such a material will not, under a rise of temperature, exert any considerable pressure upon the walls of glass, and will not so move under such increase of temperature as to disturb the lining of the glass or any other ornamentation which may have been applied to the inner surface of the glass. Not only this, but the silvering of the glass may be omitted, and the powdered material may itself be made the means of ornamenting the glass, by coloring the plaster-of-paris, or employing some similar pulverized material of different colors.

Powders differently colored might be introduced into the knob so as to give it a variegated appearance, and geometrical figures, even, might readily be formed in this way.

The cavity may be easily formed by filling the knob nearly full of the powdered material, and then pressing into it, through the orifice, a plug or former a little larger than the shank, which is to be finally inserted, which, when removed, leaves a corresponding cavity, into which the cement is to be poured; or an instrument of proper form might be inserted and turned around to give the proper shape and size to the cavity.

In the drawing annexed I have represented a knob made in the manner above described, with a portion of the shank inserted in place, the glass knob, the powdered filling, the end cement, and inner end of the shank being represented in section, while the external portion of the shank, with its flanges, is represented in elevation.

A represents the glass portion of the knob; B, the external portion of the shank, and $b$ the internal portion embedded in the cement.

C represents the powdered filling of the knob, and D the solid cement or metal which fills the cavity in the powdered material and holds the shank in place.

What I claim as my invention is—

The herein-described door-knob, consisting of a glass shell, silvered internally, and partially filled with powdered material, in which is formed the cavity to receive the cement or metal for fastening the shank to the knob.

HIRAM TUCKER.

Witnesses:
THEO. S. RANSOM,
J. A. SANBORN.